COMBINED BOX AND EASEL FOR PAINTING IN THE OPEN COUNTRY

Filed June 8, 1951 5 Sheets-Sheet 1

INVENTORS
JACQUES HENRI DESSERTENNE AND
GABRIEL ROBERT DOMINGUEZ Y SALMERON
By Linton and Linton
ATTORNEYS

COMBINED BOX AND EASEL FOR PAINTING IN THE OPEN COUNTRY

Filed June 8, 1951 5 Sheets-Sheet 2

INVENTORS
JACQUES HENRI DESSERTENNE AND
GABRIEL ROBERT DOMINGUEZ Y SALMERON
By Linton and Linton
ATTORNEYS

COMBINED BOX AND EASEL FOR PAINTING IN THE OPEN COUNTRY

Filed June 8, 1951

5 Sheets-Sheet 3

INVENTORS
JACQUES HENRI DESSERTENNE AND
GABRIEL ROBERT DOMINGUEZ Y SALMERON

By Linton and Linton
ATTORNEYS

COMBINED BOX AND EASEL FOR PAINTING IN THE OPEN COUNTRY

Filed June 8, 1951 5 Sheets-Sheet 4

INVENTORS
JACQUES HENRI DESSERTENNE AND
GABRIEL ROBERT DOMINGUEZ Y SALMERON
By Linton and Linton
ATTORNEYS

COMBINED BOX AND EASEL FOR PAINTING IN THE OPEN COUNTRY

Filed June 8, 1951 5 Sheets-Sheet 5

INVENTORS

JACQUES HENRI DESSERTENNE
AND GABRIEL ROBERT DOMINGUEZ Y SALMERON
By Linton and Linton
ATTORNEYS

United States Patent Office 2,751,271

Patented June 19, 1956

2,751,271

COMBINED BOX AND EASEL FOR PAINTING IN THE OPEN COUNTRY

Jacques Henri Dessertenne and Gabriel Robert Dominguez y Salmeron, Paris, France Application June 8, 1951, Serial No. 230,553

Claims priority, application France June 9, 1950

14 Claims. (Cl. 312—231)

Our invention has for its object a combined box and easel for artists when painting in the open country, said arrangement allowing the artist to produce his picture outside his studio and chiefly in the open country.

The combined box and easel according to the invention belongs to the known type comprising a container for the paint tubes, bottles, brushes and the like, together with canvas-carrying means and preferably folding or telescopic legs.

A primary object of the invention consists in executing a box that is of a reduced bulk when closed while being capable of offering the artist a large useful surface in its operative position.

A further object of the invention consists in producing a box adapted to enclose when in its closed position the actual canvas carrier and the legs so as to prevent the projection of any part outside the closed box.

A still further object of the invention consists in producing a box the legs of which are adapted to be easily folded and that have a reduced bulk in such a folded state.

Yet another object of the invention consists in providing a box and easel arrangement wherein the canvas carrier is angularly adjustable and is adapted to be brought into different positions, which allows the box to be used not only for oil painting but also for painting in water colours or as a drawing table.

Lastly our invention has for its object simple and efficient means for holding fast with reference to one another the telescopic portions of the box and easel arrangement and chiefly those forming the legs carrying same.

Further objects and advantages of the invention will appear in the reading of the following disclosure, reference being made to accompanying drawings illustrating various embodiments of our combined box and easel by way of a mere exemplification. In said dawings:

Figures 1, 2, 5, 6:
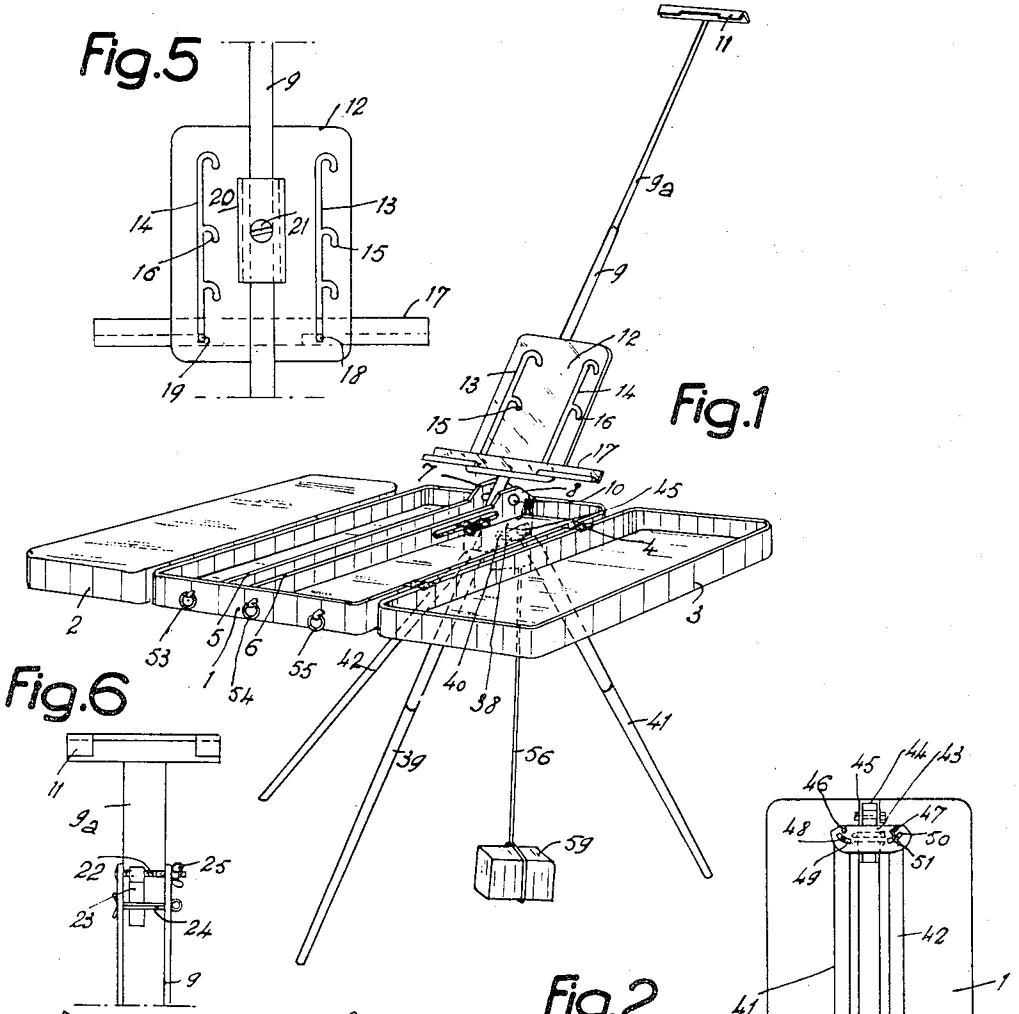
Fig. 1 is a general perspective view of a first embodiment of the box and easel system according to the invention.
Fig. 2 is a partial view from below of the actual box, the rear legs being shown in their folded position.
Fig. 5 is a partial view of the rear of the lower canvas-carrying means in the embodiment illustrated in Fig. 1.
Fig. 6 is a view of the upper part of said canvas carrier.

In the embodiment illustrated by way of example in Fig. 1, the actual box carrying the whole arrangement is constituted by three elementary boxes, to wit: a medial box 1 and two sides boxes 2 and 3 forming covers. The box 3 may be folded upwardly round hinges such as 4 in the direction of the arrow F in order to enclose the canvas-carrying means. The lateral box 2 may be folded in the direction of the arrow *f* underneath the box 1 to enclose the legs of the arrangement, whereby the latter assumes when collapsed a very reduced bulk.

In the embodiment illustrated, there is provided inside the box 1 two vertical partitions 5 and 6 defining between them a recess for the canvas-carrying means. These two partitions end in the shape of flanges 7 and 8 between which the stem 9 of the canvas-carrying means is pivotally secured through the spindle 10. The control of the angular setting of the stem 9 is obtained in a manner disclosed hereinafter with further detail. The canvas-carrying stem is preferably of the telescopic type so as to allow the use of large size canvases or panels. The canvases or panels are held at their upper end by a member 11 having a U-shaped cross-section, said members being carried at the end of a rod *9a* telescopically engaging the stem 9 and extending perpendicularly to said rod *9a*.

At the lower end of the rod 9 is secured a plate 12 provided with two longitudinal grooves 13 and 14 extending into a number of lateral elongated slots such as 15 and 16. To this plate 12 is secured a member 17 having a L-shaped cross section that serves for holding the lower edge of a canvas or panel. To this end, said member carries at its rear two studs 18 and 19 the distance between which is equal to that separating the grooves 13 and 14. It is therefore sufficient, if it is desired to modify the height of the member 17, to shift the latter vertically and then leftwards as illustrated in Fig. 5 to bring the studs 18 and 19 out of the corresponding slots respectively into the grooves 13 and 14. The member 17 is then shifted vertically to bring it into the desired level in which it is held by a movement towards the right which engages the studs 18 and 19 in corresponding lateral slots 15 and 16.

The plate 12 may be held fast on the stem 9 or else it may carry on its rear surface a sleeve 20 that allows it to slide over said stem 9 while a pressure screw 21 or the like allows holding it fast at the desired height.

Fig. 6 illustrates an embodiment, according to my invention, of the telescopic mounting of two parts that is applicable both to the legs carrying the box and to the canvas-carrying stem as illustrated in said Fig. 6. In this embodiment, the stem 9 for instance assumes a U-shaped cross-section. Between the two flanges of the U is arranged a threaded rod 22 passing over the second stem element *9a* which latter is thus held between said rod 22 and the bottom of the rod 9. The threaded rod 22 carries a spring blade 23 bearing against the rod *9a* and that is held in position by a pin 24. If the winged nut 25 engaging the rod 22 is released, the element *9a* may slide as required between the two flanges of the rod 9, whereby the upper part 11 of the canvas-carrier may be located at a suitable distance above the lower L-shaped member 17. In contradistinction, when the winged nut 25 is screwed down, the two flanges of the rod 9 are brought nearer one another and bear against the sides of the rod 9a assuming preferably a corresponding shaped, which provides for a clamping of the two telescopic elements over a large surface in a highly efficient manner without any risk of damaging either of the two said elements.

This embodiment has also for its advantage to cut out the necessity of forming in the usual manner a longitudinal slot in the bottom of the stem 9 which slot is intended usually for the passage of a threaded rod carrying a winged nut for clamping purposes. As a matter of fact, this groove has for its chief drawback a weakening of the stem 9.

Figure 7:
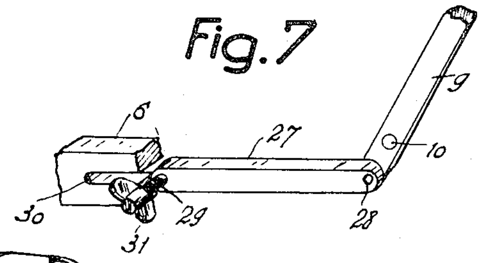
Fig. 7 is a partial perspective view of the member controlling the slope of said canvas-carrier.

Once folded, the canvas-carrying means that have just been described are housed over the upper part of the medial box 1. As disclosed hereinabove, the stem 9 is pivotally secured to the spindle 10. In the embodiment illustrated in Fig. 7, two connecting rods 26 and 27 are pivotally secured to either side of the lower end of the stem 9 beyond the spindle 10 through the agency of a spindle 28. To the ends of the connecting rods 26 and 27 remote from the stem 9 is secured a projecting transverse threaded rod or grub screw such as 29 that engages a slot 30 formed in the vertical surface of each of the corresponding partitions 5 or 6. The connecting rod 27 may be held fast in the desired position by screwing down the winged nut 31 over the threaded rod 29 and the same arrangement is provided for the connecting rod 28 that may be held fast by a similar winged nut 32. It will be readily ascertained that if said nuts 31 and 32 that hold the connecting rods 26 and 27 fast are unscrewed, it is possible to shift said connecting rods and consequently it is possible to hold the stem 9 and therewith the canvas-carrying means fast at two points constituted respectively by the spindles 20 and 28, whereby the canvas-carrying means are held in a particularly steady manner.

The pivotal connection of the canvas-carrying means described is obviously not the single one that may be contemplated and the invention includes all pivotal means incorporating a spindle located between the ends of the stem of the canvas-carrying means and an arrangement for controlling positively the slope of said means through action on the lower end of said stem. Thus, the lower end of the stem may be machined so as to assume the shape of a strap between the two flanges of which is held a tapped nut inside which may be screwed or unscrewed a threaded rod that is transversely rigid with the two vertical partitions 5 and 6 while being allowed to rotate with reference thereto.

Figure 4:
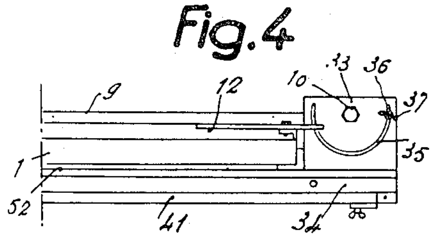
Fig. 4 is a side view of a modification.

Fig. 4 illustrates a further embodiment of the pivotal mounting of the rod of the canvas-carrying stem 9. In said figure, the spindle 10 is again mounted between two flanges 33 rigid with a U-shaped iron member 34 on which the box 1 rests. In each of the flanges 33 is provided an arcuate groove 35 that is engaged by the corresponding end of a threaded spindle 36 rigid with the end of the stem 9. It is possible through a shifting of the threaded rod 35 inside the groove 35 to give as will be readily apparent any desired angular setting of the stem 9 with reference to the box 1. This angular position is obtained through a clamping of winged nuts such as 37.

As disclosed hereinabove, the legs of the arrangement are carried between two flanges such as 38 (Fig. 1) that are located under the lower surface of the box 1, said flanges being preferably rigid and in one with the flanges 7 and 8 which latter extend consequently through the bottom of the box. The front leg 39 is directly pivoted through the spindle 40 between the two flanges considered. The rear legs 41—42 are pivotally secured to a plate 43 including an extension 44 (Fig. 2) that is pivotally secured in its turn to a spindle 45 carried between the two above-mentioned flanges 38. Each of the legs 41—42 is revolubly carried round an axis 46—47 and carries a threaded stud 48 adapted to engage a circular slot 49—50 provided in the pivoting plate 43. It is thus readily apparent that a rotation of the plate 43 round the axis 45 will move the rear legs 41—42 angularly by any desired amount away from the lower surface of the box 1. Furthermore, through a pivoting movement round the axes 46—47 and a subsequent clamping through a thumb screw such as 51, it is possible to angularly shift the legs away from one another through any amount as allowed by the length of the circular slots 49—50; this provides for a steady resting of the box on three points. Furthermore, said arrangement allows setting the rear legs in parallelism with the front leg 39 and returning the whole arrangement underneath the box.

The invention also covers the pivotal arrangement underneath the beam 52 carrying the box underneath same on the side nearest the painter, a strut engaging the front leg 39 for ensuring indeformability of the erected easel.

Figure 3:
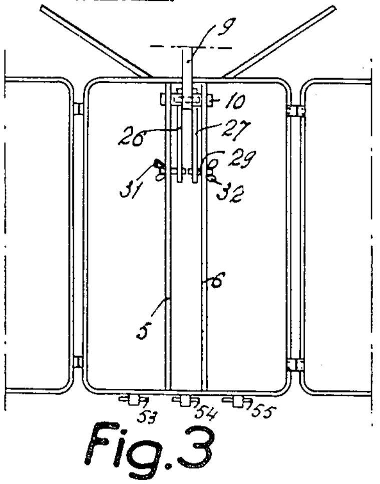
Fig. 3 is a plan view from above of the same arrangement.
Figure 10:
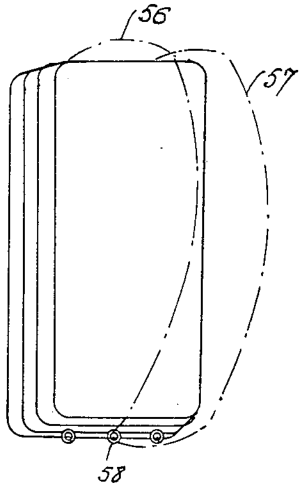
Fig. 10 illustrates the box and easel arrangement of Fig. 1 in its closed position when ready to be carried.

According to a further feature of my invention which has in particular for its result to allow carrying the box in any suitable manner as required by the user, there are provided on the front of the box rings 53—54 and 55 and on the opposite surface of the box 1, three rings arranged in the same manner as illustrated in Figs. 1 and 3; only the three front rings have been illustrated for sake of clarity. It is then possible as illustrated in Fig. 10 to use two straps or belts 56 and 57 or else a single belt of suitable length passing through a loop 58, which allows carrying the combined box and easel on the painter's back after the manner of a tourist's bag. This combination of rings allows also using a single belt passing between two rings located near the same side of the box which may be carried thus in the manner usually applied for the carrying of ordinary painting boxes.

When the box is in use, the belt 56 may carry a weight 59 so as to still further increase the stability of the whole arrangement chiefly in the case of the wind blowing (Fig. 1).

Figure 8:
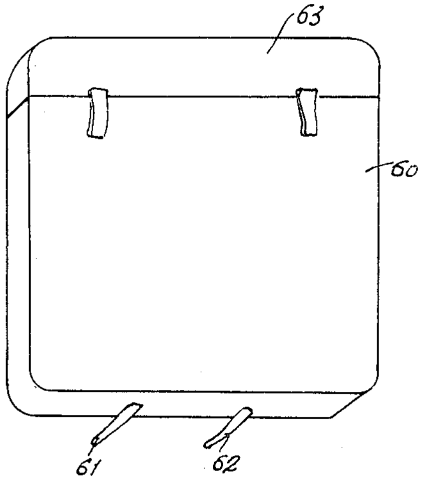
Fig. 8 is a perspective view of a bag adapted to be fitted to the box and easel arrangement according to the invention.
Figure 11:
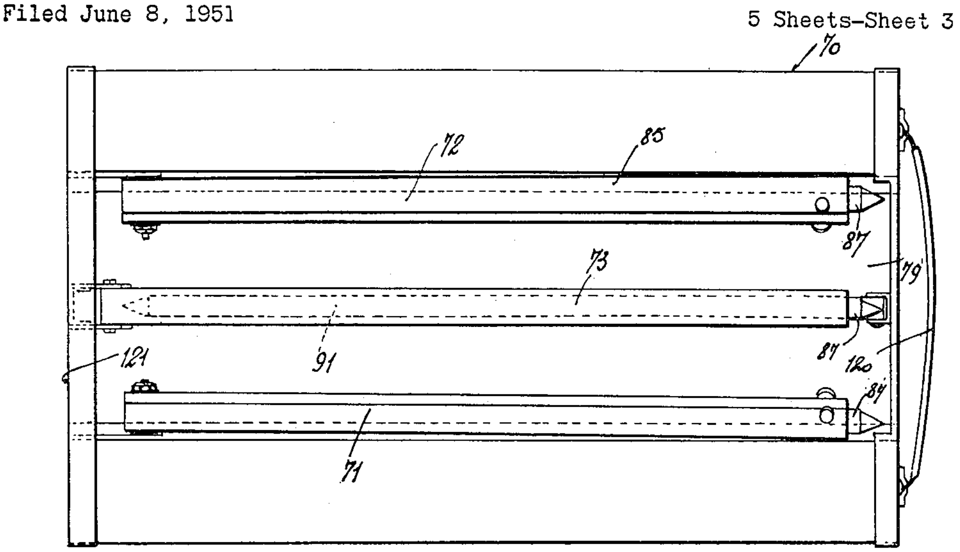
Fig. 11 is a side elevational view of a second embodiment of the box according to our invention.
Figure 12:
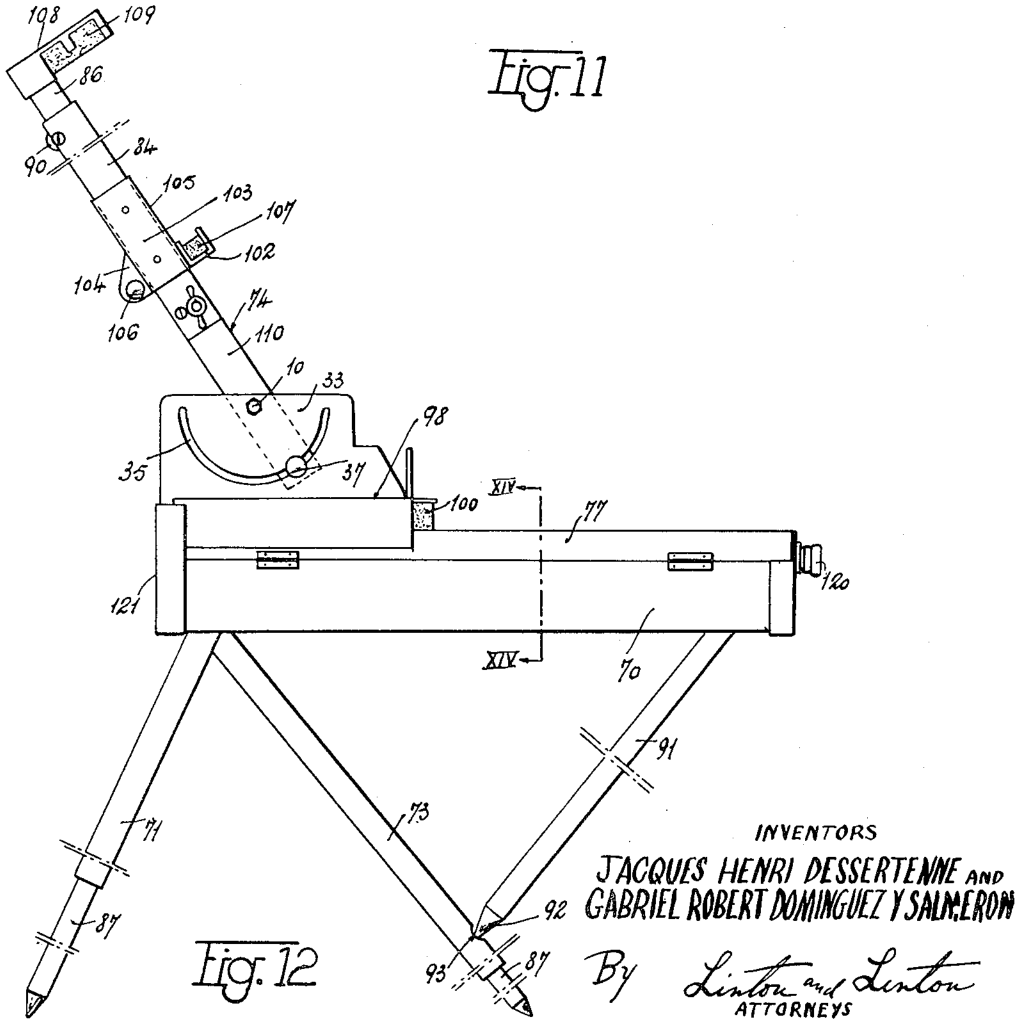
Fig. 12 is a view from below of the same box with the legs folded.

The box designed as disclosed may be associated with a canvas or the like bag (Fig. 8) adapted to be fitted over the outer surface of the box, for instance through the agency of tongues or belts such 61 and 62 engaging the above mentioned rings. This bag provided with a cover 63 allows the transportation in particular of canvases or panels that are thus protected against dust.

Figure 9:
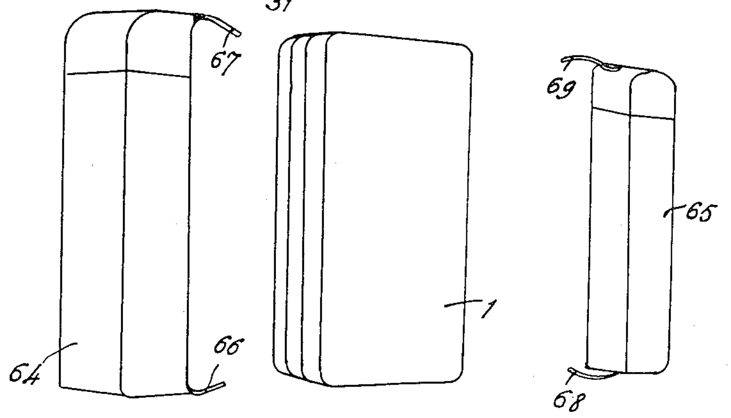
Fig. 9 illustrates diagrammatically the box and easel arrangement of Fig. 1 in its closed position with two lateral bags fitted over the box.

The invention also covers the provision of two lateral bags 64—65 (Fig. 9) also carrying flaps or lugs 66—67 on one hand and 68—69 on the other which also engage the terminal rings on the box 1 and bear against the vertical sides of the latter. Obviously the bag 60 may assume a size corresponding substantially to the surface of the box 1 or else to that of said box increased by the surface of the side bags 64 and 65.

In the example illustrated in Figs. 11 to 17, the main parts of the combined box and easel are constituted by the actual box 70 provided with its rear legs 71 and 72, a front leg 73 and a canvas-carrying mast 74. As disclosed hereinafter, the cover of said box is constituted by the oil-color palette 75 and a plate 76 above the latter and which may be used as a palette for water colors. The two palettes forming the cover are held in position by two folding members 77 and 78 to be described with further detail hereinafter.

Figure 14:
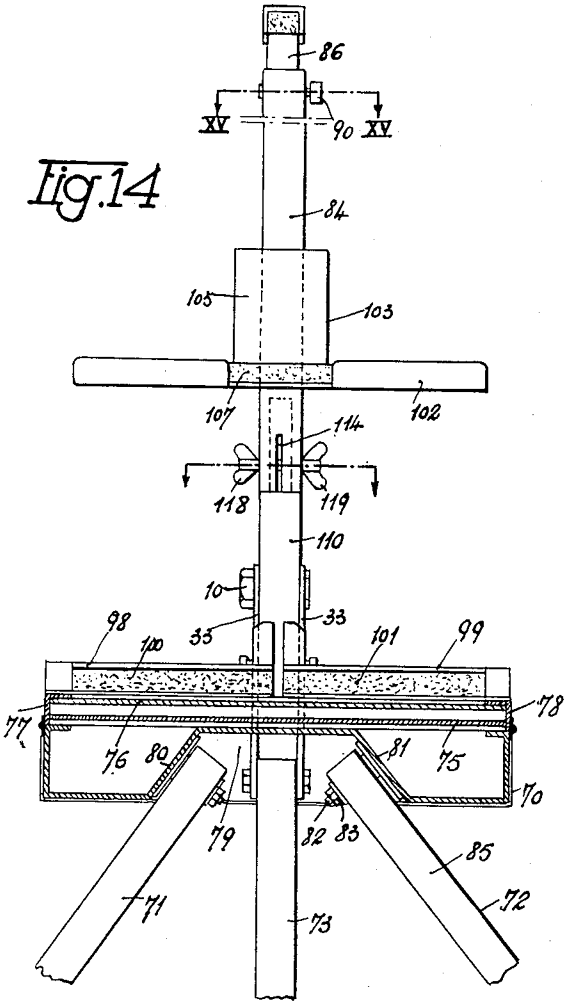
Fig. 14 is a front elevational view partly cross-sectional through line XIV—XIV of Fig. 12.

As more clearly apparent from inspection of Fig. 14, the bottom of the actual box includes a depression 79 housing the rear legs 71 and 72 and the front leg 73. The rear legs 71 and 72 are respectively carried by the sloping surfaces 80 and 81 of said recess that, as more readily apparent in Fig. 12, extends throughout the length of the box. This mounting of the legs may be performed frictionally through the agency of threaded rods such as 82 and of bolts such as 83 preferably with the interposition of leather washers.

Through this mounting, the legs lie in their folded position in parallelism with the longitudinal axis of the box (Fig. 12) and in their unfolded position, they form an acute angle with one another (Fig. 14).

These legs, as also all the extensible parts of the box, are provided with a particular mounting of their telescopic elements in accordance with one of the chief features of our invention, said features being capable of association with any of the features described. This mounting is readily apparent from inspection of Fig. 15 which is a cross-section of the canvas-carrying mast in register with the clamping means.

The mast, as also each leg, may include an outer element 84 or 85 which, in the example illustrated, is constituted by a tube having a square cross-section. Inside said outer tubular element may slide an element 86 (or 87) having a U-shaped cross-section. The flanges **86*a* of said element 86 have a height that is clearly less than the side of the element 84 so as to leave a free passage for a threaded rod 88 passing transversely through the pipe 84. Inside the U-shaped element 86 is arranged a cube-shaped or the like member 89 provided near the surface that does not face the U-shaped element with a taping inside which is screwed the threaded rod 89. The length of the sides of the member 89 is slightly less than the distance separating the inner surfaces of the flanges 86*a* of the element 86. The rod 88 is operable from the outside through the milled knob 90**.

Figure 15:
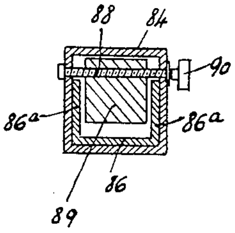
Figs. 15 and 16 are cross sections respectively through lines XV—XV and XVI—XVI of Fig. 14.
Figure 16:
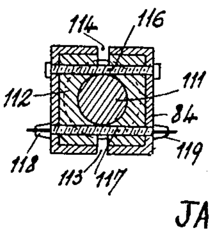
Figure 17:
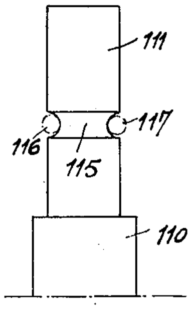
Fig. 17 is a view of a detail fixture.

When the knob 90 is caused to rotate to bring the member 88 into the position illustrated in Fig. 15, no pressure is exerted on the flanges **86*a* and consequently the inner element 86 is free to be shifted inside the outer element 84. When starting from the position considered, the knob 90 is rotated, the member 89 is screwed or unscrewed with reference to the threaded rod 88 and comes into contact with one of the flanges 86*a* to bear against the latter and to urge it against the inner surface of the element 84. The elements 84 and 86 are thus held fast and the clamping is all the more energetic when the pressure of the element 89** is exerted on a larger surface.

In order to increase the stability of the box, it is of advantage to provide a strut 91 pivotally secured to the front edge of the box (Fig. 12) while its lower end 92 engages a notch 93 provided in the front leg 73 of the box.

As disclosed hereinafter, the box is closed by the oil color palette 75 and by the plate 76 which, in the example illustrated, are both adapted to slide perpendicularly to the longitudinal axis of the box. To this end, there is provided a double slideway 95—95 at each end of the box. The slideway 95 may in particular be constituted by a folding of the front transverse edge of the box. When the palettes 75 and 76 are in their closed position, they are held fast by the collapsible elements 77 and 78 hinged to the longitudinal edges of the box.

Figure 13:
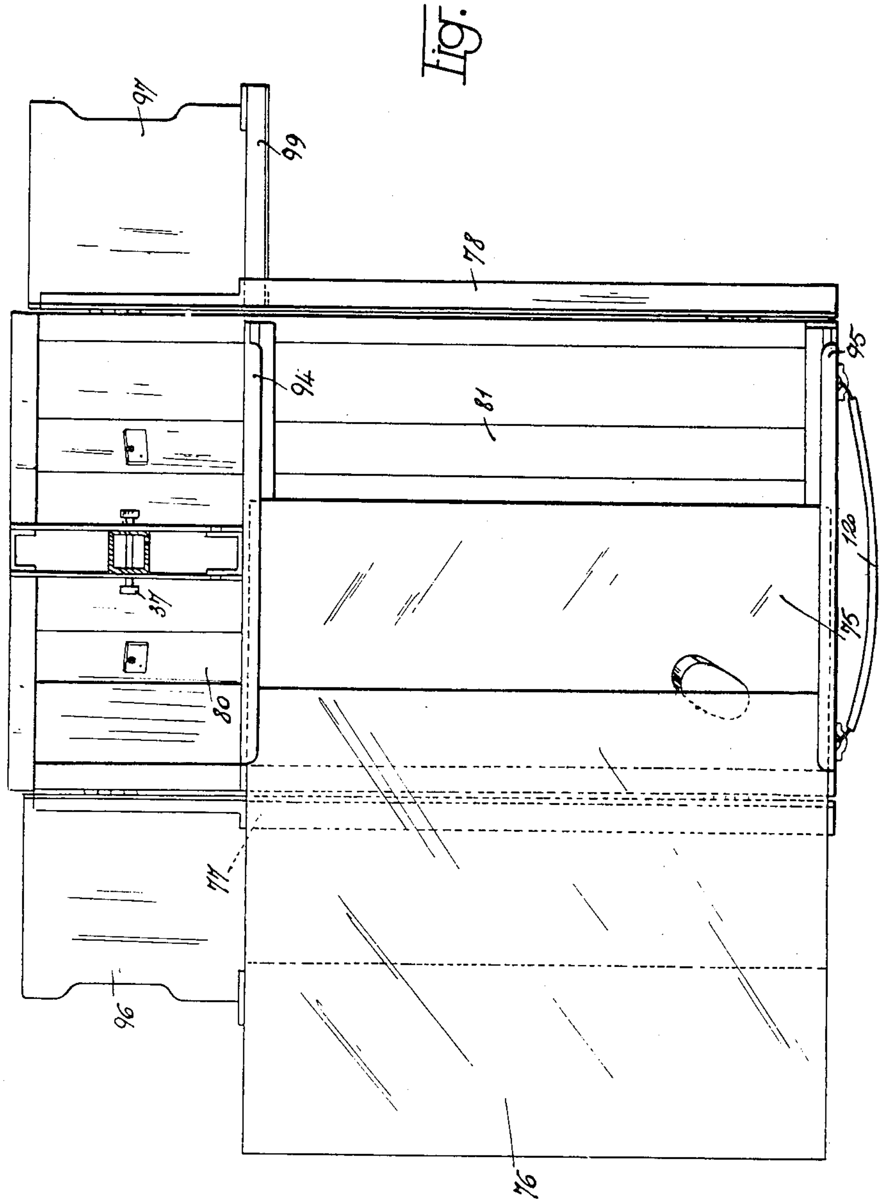
Fig. 13 is a view from above, the different elements of the box being shown in their developed position.

As illustrated more particularly in Fig. 13, these foldable elements include flat extensions 96 and 97 that serve as a cover for the rear of the box that is not closed by the palette 75.

In the embodiment disclosed, these foldable elements 77 and 78 carry along their inner edges two members 98 and 99 assuming the shape of a U in transverse cross section. Between the two flanges of the U-shaped members are laid elastic members 100 and 101 that may be constituted in practice by blade springs or the like elastic means, that are constituted in the present case by strips of sponge rubber. The part played by the members 98—99—100—101 will be disclosed hereinafter.

The mast 74 is pivotally secured between two flanges 33 passing through the bottom of the box and serving also as a mounting for the front leg 73 of the box (Fig. 14).

The mounting is performed in a manner such as to allow a rotation of the mast round a stationary spindle 10 and its clamping by means of a nut cooperating with a bolt rigid with the end of the mast 74 passing through the semi-circular slots such as 35 provided in the flanges 33.

Obviously, the stationary spindle considered may, in a modification, be located at the end of the mast and the bolt may be located between the two ends of said mast, in which case the slot 35 assumes a position that is symmetrical of that shown in the drawing.

Along the mast is slidingly carried a canvas-carrying gutter-shaped member. This member is constituted by a U-shaped member 102 perpendicular to the mast 84 and the opening of which is directed upwardly. This gutter or U-shaped member is rigid with a member 103 that is bored to allow its sliding over the mast 84.

The whole arrangement may be clamped to the mast 84 at any desired level through the agency of two flanges such as 104 arranged to either side of the mast 84 and that are rigid with the front surface 105 of the member 103, the two flanges being urged towards one another in order to clamp the mast 84 between them as provided by a bolt 106 associated with a winged nut. Preferably, the U-shaped member 102 is provided with an elastic lining constituted in the case illustrated by a strip 107 of sponge rubber.

The telescopic rod 86 forming the end of the mast ends upwardly with a transverse member or cross-piece 108 which latter engages the upper edge of the canvas or panel preferably through the agency of a yielding strip 109, say of sponge rubber. The vertical location of the cross-piece is adjusted through a sliding of the rod 86 inside the tube 84 and it is held fast therein through an arrangement of the type disclosed with reference to Fig. 15.

The cross-piece 108 is designed so as to engage at least two panels simultaneously, which arrangement allows the easy transportation of panels or canvases as disclosed hereinafter.

In accordance with a further feature of said invention, the upper part of the mast that includes the canvas-carrying means may pivot round the longitudinal axis of said mast which allows a suitable angular setting of the canvas with reference to the box. To this end, the lower section 110 of the mast is provided with an axial projection 111 (Fig. 17) adapted to engage an opening provided axially of the tubular mast section 84 that is solid in register with said opening as provided for instance by means of a wood or metal plug 112. This end of the tubular section is provided preferably with longitudinal slots 113 and 114 to improve its elasticity. The projection 111 includes a circular groove 115 and the sections 84 and 110 are rigidly secured together in the axial direction while being capable of a relative rotary movement, through the rivets 116 and through the threaded rods 117 passing through the tubular section 84 and engaging the groove 115. Winged nuts 118 and 119 allow through their screwing down a clamping of the tubular section 84 to the lower section 110 in any desired angular position. This arrangement has for its result to allow a relative rotation between said two portions without the user being able to dismantle them.

For the transportation of the box, the canvas-carrying mast is folded forwardly and the gutter-shaped member 102 is located substantially in vertical alignment with the elements 98 and 99. This arrangement is of interest inasmuch as it allows inserting the canvases or panels to be carried between the cross-piece 108 and the gutter-shaped member 102 on one hand, and the gutter-shaped parts 98 and 99 on the other.

The transportation of the box may be obtained through the handle 120. According to the invention, it is also possible to provide two movable rings on the small side 121 of the box opposed to the handle, said rings being adapted, in association with the rings forming the handle 120 to allow the insertion of two straps and the box may thus be transported after the manner of a mountaineer's or tourist's bag.

Obviously, the invention should not be construed as limited to the embodiments disclosed and many modifications may be brought thereto within the scope of accompanying drawings.

What we claim is:

1. A combined easel and box for painting in the open comprising in combination a paint box, a pair of parallel flanges extending across said box to opposite sides of the bottom thereof, a canvas-carrying mast pivotally secured between the upper edges of an end portion of said flanges, a plurality of legs pivotally secured between the lower parts of said flanges adjacent said mast, said mast and legs being adapted to be collapsed against said box and means for holding said mast and said legs in any desired angular position relative to said box.

2. A combined easel and box for painting in the open comprising in combination a paint box, a pair of parallel flanges extending across said box to opposite sides of the bottom thereof, a canvas-carrying mast, a spindle carried transversely by said mast and pivotally carried between an end portion of said two flanges, means for holding said mast fast to said flanges, a plurality of legs pivotally secured between the lower parts of said flanges adjacent said mast, said mast and legs being adapted to be collapsed against said box and means for holding said legs in any desired angular position relative to said box.

3. A combined easel and box for painting in the open comprising in combination a paint box, a pair of parallel longitudinally slotted flanges extending across said box to opposite sides of the bottom thereof, a canvas-carrying mast, a spindle carried transversely by said mast and pivotally carried between said pair of flanges, at least one link pivotally secured at one end to the lower end of said mast, a transverse threaded spindle rigid with the other end of said link and engaging said slots provided in said flanges, a nut in threaded engagement with the end of said threaded spindle for holding it fast in any selected position longitudinally of said slot, a plurality of legs pivotally secured between the lower parts of said flanges adjacent said mast, said mast and legs being adapted to be collapsed against said box and means for holding said legs in any desired angular position with reference to said box.

4. A combined easel and box for painting in the open comprising in combination a paint box, a pair of parallel flanges extending across said box to opposite sides of the bottom thereof, a canvas-carrying mast pivotally secured between the upper edges of said pair of flanges, at least one leg pivotally secured between the lower parts of said flanges adjacent said mast, said mast and leg being adapted to be collapsed against said box, a plate pivotally secured between the lower edges of said flanges and adapted to rock in a plane perpendicular to the plane of said box, two legs pivotally secured to said plate and adapted to move angularly with reference to one another and to said plate in a plane parallel to said plate, separate means for rigidly clamping said plate to said flanges and said legs to said plate in any desired position of said plate and legs with reference to said flanges, a third leg pivotally secured to the lower edges of said flanges and means for clamping said mast in any desired angular position with reference to said box.

5. A combined easel and box for painting in the open comprising in combination a paint box, a pair of parallel flanges extending across said box to opposite sides of the bottom thereof and provided in their upper portions with corresponding arcuate slots, a canvas-carrying mast, a spindle carried transversely by said mast and pivotally mounted between said two flanges, at least one leg pivotally secured between the lower parts of said flanges, said mast and leg being adapted to be collapsed against the box, a threaded rod projecting to either side transversely of the lower end of said mast and engaging said arcuate slots in said flanges, at least one nut in threaded engagement with said threaded rod outside said flanges to hold said mast in any desired angular position and means for holding said leg fast in its open and collapsed positions.

6. A combined easel and box for painting in the open comprising in combination a paint box, a pair of parallel flanges extending across said box to opposite sides of the bottom thereof and provided in their upper portions with corresponding arcuate slots, a canvas-carrying mast, a spindle carried transversely by said mast and pivotally carried between said two flanges, at least one leg pivotally secured between the lower parts of said flanges, said mast and leg being adapted to be collapsed against the box, a threaded rod projecting to either side transversely of the lower end of said mast and engaging the arcuate slots in said flanges, at least one nut in threaded engagement with said threaded rod outside said flanges to hold said mast in any desired angular position, a plate adapted to move along the lower end of said mast, a U-shaped member shiftably carried by said plate, means for holding said plate fast with reference to said mast, a second U-shaped member secured to the upper end of said mast, the flanges of said two U-shaped members being directed towards one another and means for holding said leg fast selectively in its operative and collapsed positions.

7. A combined easel and box for painting in the open comprising in combination a paint box, a pair of parallel flanges extending across said box to opposite sides of the bottom thereof, a canvas-carrying mast pivotally mounted between said two flanges, at least one leg pivotally secured between the lower parts of said flanges, said mast and leg being adapted to be collapsed against said box, two box-shaped covers pivotally secured each to an opposite side of said paint box and adapted to be folded respectively over the upper part of said paint box to enclose the collapsed canvas-carrying mast and under the bottom of the box to enclose said legs collapsed under the latter.

8. A combined easel and box for painting in the open, comprising in combination a paint box including a bottom having a longitudinal depression between oblique upwardly directed walls, a pair of parallel flanges extending across said depression and projecting beyond the bottom of said box, a canvas-carrying mast pivotally secured between the upper edges of said flanges, a leg pivotally secured between the lower edges of said flanges, and two further legs pivotally secured to the corresponding longitudinal oblique walls of the recess in said box.

9. A combined easel and box for painting in the open comprising in combination a paint box including a bottom having a longitudinal depression between oblique upwardly directed walls, a pair of parallel flanges extending across said depression and projecting beyond the bottom of said box, said flanges being provided with semi-circular notches registering with one another, a canvas-carrying mast, a spindle rigidly connected to said mast and pivotally secured between the upper edges of said flanges, said mast comprising three superimposed sections, the medial section being revolubly carried by the lower section round the longitudinal axis of said mast and the upper section being telescopically and collapsibly carried by said medial part, means for holding fast the different sections of said mast in the desired relative position thereof, a threaded rod projecting to either side of the lower end of the lower section of said mast and engaging the semi-circular notches in said flanges, at least one nut in threaded engagement with said threaded rod on the outside of said flanges to secure said mast in any desired angular position, a leg pivotally secured between the lower edges of said flanges and two further legs pivotally secured to the corresponding longitudinal walls of said depression.

10. A combined easel and box for painting in the open comprising in combination a paint box including a bottom having a longitudinal depression between oblique upwardly directed walls, two parallel flanges extending across said depression and projecting beyond the bottom of said box, said flanges being provided with semi-circular notches registering with one another, a canvas-carrying mast, a spindle rigid with said mast and pivotally secured between the upper edges of said flanges, said mast comprising three superimposed sections, the medial section being revoluble carried by the lower section round the longitudinal axis of said mast and the upper section being telescopically and collapsibly carried by the medial part, means for locking the medial section of said mast with reference to the lower section including a cylindrical pin rigid with one of said sections in alignment with the axis thereof and provided with a peripheral annular groove, a recessed portion formed in the other section for carrying axially said pin, said other section being slotted along a plane passing through its longitudinal axis, two short transverse rods engaging the groove in said pin and carried transversely by the cooperating end of said other section, at least one of said rods being threaded at one end, a nut engaging said threaded end for locking the two sections together in the desired angular position, means for locking the upper section of said mast to said medial section, a threaded rod projecting to either side of the lower end of the lower section of said mast and engaging the semi-circular notches in said flanges, at least one nut in threaded engagement with said threaded rod on the outside of said flanges to secure said mast in any desired angular position, a leg pivotally secured between the lower edges of said flanges and two further legs pivotally secured to the corresponding longitudinal walls of said depression.

11. In a combined box and easel arrangement, a telescopic mast for a folding paint box and easel comprising a hollow outer section defining an inner space assuming a square cross-section and an inner section assuming a U-shaped cross-section fitted inside said first section, a four-sided locking member fitted between the flanges of said second section and provided with a transverse threaded bore, a threaded rod passing through the walls of said outer section and through said bore on the outside of the edges of the flanges of said inner U-shaped section and means controlling from the outside the rotation of said rod to urge said four-sided member into engagement with one of said flanges to urge the latter against the cooperating side of said first section.

12. A combined easel and box for painting in the open, comprising in combination a paint box including a bottom having a longitudinal depression between oblique upwardly directed walls, a pair of parallel flanges extending across said depression and projecting beyond the bottom of said box, said flanges being provided with semi-circular notches registering with one another, a canvas-carrying mast, a spindle rigid with said mast and pivotally secured between the upper edges of said flanges, a leg pivotally secured between the lower edges of said flanges, two further legs pivotally secured to the corresponding longitudinal walls of said depression, slideways provided along the upper edges of the two opposed side walls of said box, at least one palette cooperating with said slideways and adapted to close the box, two flat L-shaped members the larger rectilinear webs of which are pivotally secured to the corresponding sides of said box that are perpendicular to said slideways, the smaller webs of the L-shaped member being positioned facing said flanges and a transverse U-shaped member provided on each of said smaller webs and projecting outwardly when said flat L-shaped members are folded over said box.

13. A combined easel and box for painting in the open, comprising in combination a paint box including a bottom having a longitudinal depression between oblique upwardly directed walls, a pair of parallel flanges extending across said depression and projecting beyond the bottom of said box, a canvas-carrying mast, a spindle rigid with said mast and pivotally secured between the upper edges of said flanges, a notched leg pivotally secured between the lower edges of said flanges, two further legs pivotally secured to the corresponding longitudinal walls of said depression and a strut pivotally secured to the bottom of the said box at the end thereof remote from the point at which the first leg is pivotally secured to said front box, the free end of said strut removably engaging the notched part of said first leg.

14. A combined easel and box for painting in the open, comprising in combination a paint box including a bottom having a longitudinal depression between oblique upwardly directed walls, a pair of parallel flanges extending across said depression and projecting beyond the bottom of said box, a canvas-carrying mast, a spindle rigid with said mast and pivotally secured between the upper edges of said flanges, a leg pivotally secured between the lower edges of said flanges, two further legs pivotally secured to the corresponding longitudinal walls of said depression, slideways mounted along the upper edges of the two opposed side walls of said box, at least one palette cooperating with said slideways and adapted to close said box, two flat L-shaped members the larger rectilinear webs of which are pivotally secured to the corresponding sides of said box that are perpendicular to said slideways, the smaller webs of said L-shaped member being positioned facing said flanges, a transverse U-shaped member provided on each of said smaller webs and projecting outwardly when said flat L-shaped members are folded over said box, and two U-shaped members carried by said mast at an adjustable distance from one another and adapted to hold a canvas between them and to engage the latter when said mast is collapsed against said transverse U-shaped members.

References Cited in the file of this patent

UNITED STATES PATENTS

| | | |
|---|---|---|
| 576,803 | Bernstein | Feb. 9, 1897 |
| 654,841 | Sabin-MacDonald | July 31, 1900 |
| 835,144 | Thiele | Nov. 6, 1906 |
| 1,212,188 | Couper | Jan. 16, 1917 |
| 2,372,077 | Glinecki | Mar. 20, 1945 |
| 2,586,524 | Dussardier | Feb. 19, 1952 |